United States Patent
Ziu

[19]

[11] Patent Number: 5,452,922
[45] Date of Patent: Sep. 26, 1995

[54] ELBOW FITTINGS WITH EXPANDED OUTER ANNULUS SPACE FOR DOUBLE-CONTAINMENT ASSEMBLIES

[75] Inventor: Christopher G. Ziu, 227 E. Lafayette St., Easton, Pa. 18042

[73] Assignee: Christopher G. Ziu, Merrimack, N.H.

[21] Appl. No.: 89,798

[22] Filed: Jul. 9, 1993

[51] Int. Cl.[6] .................. F16L 9/18; F16L 39/00
[52] U.S. Cl. ................ 285/133.1; 285/138; 285/179; 138/113
[58] Field of Search .............. 406/193; 376/292; 138/112, 113, 114; 285/133.1, 138, 127, 179, 180, 181, 182, 183, 131, 132, 45; 174/81

[56] References Cited

U.S. PATENT DOCUMENTS

| | | | |
|---|---|---|---|
| 209,103 | 10/1878 | Austin . | |
| 294,977 | 3/1894 | Eberhardt | 285/133.1 |
| 316,967 | 5/1885 | Heber . | |
| 1,160,703 | 11/1915 | Fleming . | |
| 1,774,151 | 8/1930 | Olley | 174/81 |
| 2,475,635 | 7/1949 | Parsons | 138/65 |
| 2,592,574 | 4/1952 | Kaiser | 285/133.1 |
| 3,378,672 | 4/1968 | Blumenkranz | 219/200 |
| 3,792,187 | 2/1974 | Depcrymski | 285/133.1 |
| 4,108,476 | 8/1978 | Krupp | 285/133.1 |
| 4,384,913 | 5/1983 | Dana et al. | 156/425 |
| 4,644,780 | 2/1987 | Jeter | 376/292 |
| 4,684,155 | 8/1987 | Davis | 406/193 |
| 4,718,568 | 1/1988 | Dal Palû | 285/227 |
| 4,805,444 | 2/1989 | Webb | 73/40.5 |
| 4,886,305 | 12/1989 | Martin | 285/133.1 |
| 4,930,544 | 6/1990 | Ziu | 138/113 |
| 5,031,940 | 7/1991 | Stefanos | 285/179 |
| 5,082,027 | 1/1992 | Stanley | 138/113 |
| 5,186,502 | 2/1993 | Martin | 285/133.1 |
| 5,188,396 | 2/1993 | Calvin | 285/367 |
| 5,197,518 | 3/1993 | Ziu | 138/113 |
| 5,205,592 | 4/1993 | Ziu | 285/45 |
| 5,275,440 | 1/1994 | Esser | 406/193 |
| 5,398,973 | 3/1995 | McAtamney | 285/3 |

FOREIGN PATENT DOCUMENTS

| | | | |
|---|---|---|---|
| 399192 | 7/1924 | Germany | 285/133.1 |
| 2-248792 | 10/1990 | Japan | 285/138 |
| 92724 | 10/1958 | Norway | 285/133.1 |
| 2237613 | 5/1991 | United Kingdom | 285/138 |

*Primary Examiner*—Eric K. Nicholson
*Attorney, Agent, or Firm*—McCormick, Paulding & Huber

[57] ABSTRACT

An elbow fitting for a double-containment assembly has an inner elbow section contained within an outer elbow section, and the inner elbow section is coupled to corresponding straight sections of inner pipe and the outer elbow section is coupled to corresponding straight sections of outer pipe. The inner elbow section defines a first centerline radius of curvature or a first centerline-to-end radius, and the outer elbow section defines a second centerline radius of curvature or a second centerline-to-end radius. The first centerline radius of curvature is greater than the second centerline radius of curvature, and the first centerline-to-end radius is greater than the second centerline-to-end radius, forming an expanded outer annulus space in comparison to the inner annulus space. The annulus between the inner and outer elbow sections is unobstructed permitting movement of the inner and outer elbow sections relative to each other. The expanded outer annulus space accommodates for differential thermal expansion or contraction of the inner and outer piping components relative to each other.

26 Claims, 5 Drawing Sheets

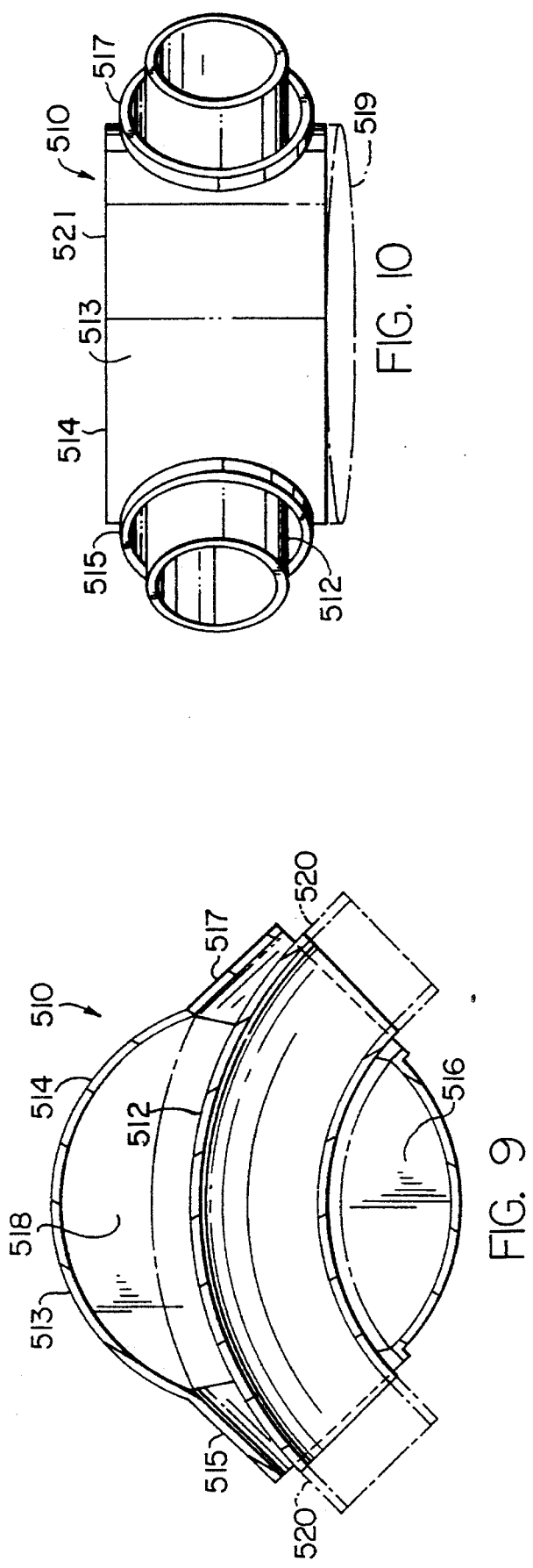

ELBOW FITTINGS WITH EXPANDED OUTER ANNULUS SPACE FOR DOUBLE-CONTAINMENT ASSEMBLIES

FIELD OF THE INVENTION

The present invention relates to double-containment assemblies including an inner pipe or conduit located within an outer pipe, conduit or containment component, and more particularly, to elbow fittings for such double-containment assemblies for providing changes in direction in such assemblies.

BACKGROUND INFORMATION

There are numerous systems available for providing a double or dual-containment piping assembly including inner or primary pipes contained within outer or secondary containment pipes to deliver dangerous or hazardous fluid within the inner pipes. In the event of a leak or emission of the fluid or vapor from the inner pipes, the leaking substance is intended to be safely contained within the outer pipes. Historical applications for such double-containment systems are found in the nuclear, gas and petroleum refining, and chemical processing industries. It is also known to provide certain types of detectors and/or drainage devices in the annulus between the inner and outer pipes in the event that there is leakage to detect and/or collect any such leakage.

Differential thermal expansion in double-containment systems occurs when the inner and outer pipes expand or contract to different degrees, at different rates, or both. Almost all chemical and petroleum double-containment systems are subject to changes in temperature during operation, or differences in operating temperature between the inner and outer piping components. Such temperature changes can result in relatively substantial expansion and/or contraction of the inner piping components relative to the outer piping components, or vice-versa. For example, in underground double-containment systems, there is typically relatively cool soil or earth surrounding the outer piping components, and a relatively hot fluid flowing through the inner piping components, increasing the temperature of the inner piping components relative to the outer piping components, and in turn causing differential thermal expansion of the inner piping toward the outer piping. Another typical situation occurs with above-ground double-containment systems, when such systems are initially installed during relatively hot weather, and a substantially constant temperature fluid is pumped through the inner piping components, and the systems are subsequently subjected to ambient cooling. In this situation, the outer pipes contract relative to the inner pipes, and move toward the inner pipes.

When the inner piping components expand or contract relative to the outer piping components, and if the inner piping components are installed in an axially unrestrained manner, the deflection of the primary piping due to the growth or contraction of the inner piping accumulates at the elbow sections of the inner piping. In this case, the inner elbow sections are subjected to bending and/or torsional movements. Although elbow fittings by their nature are capable of greater flexibility than comparable straight sections of pipe, when elbow sections are subject to bending and/or torsional movements, stresses are intensified, and in some instances, this intensification in stress can lead to failure. There are piping design codes setting forth the maximum allowable stress, depending upon the material, wall thickness, etc., of elbow components.

In the United States and Canada, and many other parts of the world, the code which governs the design and implementation of chemical and petroleum piping systems is the ANSI/ASME B31.3 Chemical Plant and Petroleum Refinery Piping Code, which presents simplified methods for determining bending stresses of elbows in chemical piping systems due to expansion and contraction. Appendix D of this Code presents equations for a flexibility factor (k), in-plane and out-of-plane stress intensification factors, and the flexibility characteristics of many piping components, including elbows.

Based on these established equations, all other variables being equal, the greater the centerline-to-end radius (R) (or the centerline radius) of an elbow section in comparison to the cross-sectional radius (r) of the elbow section, the higher the value of the flexibility characteristic (R), and thus the lower is the resultant stress intensification factors ($^fo$ and $^fi$). Accordingly, the lower the values of the stress intensification factors, the lower is the resultant bending stress at the elbow. In a double-containment piping assembly, therefore, if the elbow fitting is free to bend, and the piping adjacent to the elbow fitting is free to bend, the greater the centerline-to-end radius of each elbow section (up to reasonable limits), the lesser is the stress that is developed within the elbow fitting.

In many double-containment piping systems to date, however, the inner piping components are not permitted to bend or otherwise move either laterally or axially relative to the outer piping components, particularly in the area of the elbow fittings. In other known double-containment piping systems, the inner piping components may be able to move relative to the outer piping components, but only within narrow limits, and once these narrow limits are exceeded, the inner piping components come into contact with the outer piping components. In either case, the elbow fittings are not allowed to fully bend or flex in response to differential thermal expansion or contraction; instead, the elbow fittings essentially behave as internal anchors, and become points of restraint. In these double-containment systems, there is no means for accommodating or alleviating the differential thermal expansion and/or contraction of the inner and outer piping components relative to each other, and thus such systems operate as restrained systems, developing large axial stresses, which can lead to failure, and leakage of hazardous fluids and vapors.

A typical practise in the double-containment piping industry has been to use standard off-the-shelf elbow sections for single-wall piping applications to form the elbow fittings for double-containment piping systems. Elbow fittings produced commercially throughout the world are standardized in terms of radii. Historically, elbow fittings have primarily been produced using two standard conventions for defining the centerline radius of curvature, regardless of the material of construction of the pipe, or the diameter or wall thickness of the pipe. These two standard conventions are the "short-radius" elbow fitting and the "long-radius" elbow fitting. The short-radius elbow fitting is defined as having a centerline radius of curvature which is approximately equal to the nominal diameter of a corresponding straight section of pipe. A long-radius elbow fitting is defined as having a centerline radius-of-curvature which is approximately equal to 1.5 times the diameter of the corresponding straight section of pipe.

Another type of standard elbow fitting somewhat common for sanitary applications, referred to as the "long-sweep sanitary elbow", has a centerline radius of curvature approximately equal to 1 to 1.5 times the nominal diameter of a corresponding straight section of pipe.

The standard practice in the double-containment piping industry has been to use commercially available short-radius/short-radius combinations of such inner and outer elbow fittings. In this case, the centerline radius of curvature of the inner elbow section is always less than the centerline radius of curvature of the outer elbow section. Because the corresponding straight sections of pipe are concentrically mounted with respect to each other, the inner elbow section is not concentrically mounted within the outer elbow fitting, but rather is offset so that the spacing is more narrow between the larger-radius surfaces of the inner and outer elbow sections than it is between the smaller-radius surfaces of the inner and outer elbow sections.

As a result, when there is differential thermal expansion or contraction between the inner and outer piping components, the inner and outer elbow sections frequently contact each other at the point where there is the least amount of space between the fittings, thus causing a high localized stress, which can in turn cause one or both fittings to fracture. This is the source of numerous premature failures in known double-containment piping systems.

Another drawback of these prior double-containment piping systems employing standard fittings, is that the centerline radius of the inner elbow section is less than the centerline radius of the outer elbow section, thus typically creating a higher level of stress within the inner elbow section than is desired during operation when the elbow section is subjected to bending or torsional movements, which can in turn lead to premature failure.

It is an object of the present invention to overcome the drawbacks and disadvantages of known double-containment piping systems, particularly the elbow fittings of known double-containment piping systems.

SUMMARY OF THE INVENTION

The present invention is directed to double-containment assemblies, and particularly to elbow fittings for double-containment assemblies with expanded outer annulus spaces for accommodating differential thermal expansion or contraction of the inner piping components and the outer piping components relative to each other.

In one embodiment of the present invention, an elbow fitting for a double-containment pipe assembly comprises an outer elbow section defining a first centerline radius of curvature, and an inner elbow section received within the outer elbow section and defining a second centerline radius of curvature greater than the first centerline radius of curvature. Because of this unique combination of radii, the distance between the smaller-radius walls of the inner and outer elbow sections is less than the distance between the larger-radius walls of the inner and outer elbow sections when the fitting is initially installed for accommodating movement of the inner and outer elbow sections relative to each other in response to differential thermal expansion or contraction. The elbow fittings of the present invention preferably define a substantially unobstructed space throughout the annulus between the inner and outer elbow sections for displacement of the inner and outer elbow sections relative to each other in response to differential thermal expansion or contraction.

In one embodiment of the present invention, each end of the inner elbow section includes either a socket for socket joining to straight sections of pipe or a substantially flat section for butt joining to straight sections of pipe. Each end of the outer elbow section also includes either a socket for socket joining to straight sections of pipe or a substantially flat section for butt joining to straight sections of pipe.

The present invention is also directed to a double-containment assembly including at least one inner pipe located within at least one outer containment component, and an elbow fitting including an inner elbow section coupled to a corresponding inner pipe, and an outer elbow section coupled to a corresponding containment component. The inner elbow section defines a smaller-radius surface, and a larger-radius surface on a substantially opposite side of the inner elbow section relative to the smaller-radius surface. The elbow fitting defines a first annulus width between the smaller-radius surface and the outer elbow section, and a second annulus width between the larger-radius surface and the outer elbow section. The first annulus width is less than the second annulus width for accommodating differential thermal expansion or contraction of the inner piping and the containment components relative to each other. The elbow fitting preferably defines a substantially unobstructed space throughout the annulus between the inner and outer elbow sections in order to permit displacement of the inner and outer elbow sections relative to each other.

In one embodiment of the present invention, the ends of either the inner or outer elbow sections, or both, each define a socket connection, and an annular surface tapering inward and extending between the socket connection and the outside surface of the respective elbow section.

One advantage of the elbow fittings of the present invention, is that the unique radius combination of the inner and outer elbow sections and/or the eccentric portion of the outer elbow section, provides a greater distance across the outer annulus space between the inner and outer elbow sections, than the distance across the inner annulus space between the inner and outer elbow sections. This expanded, or relatively wide outer annulus space accommodates differential thermal expansion or contraction between the inner and outer piping components by permitting the inner and outer elbow sections to move relative to each other without contacting one another, and causing failure, as was the case with prior art double-containment elbow fittings.

Other advantages of the present invention will become apparent in view of the following detailed description and accompanying drawings.

BRIEF DESCRIPTION OF THE DRAWINGS

FIG. 9 is a cross-sectional view of another embodiment of an elbow fitting of the present invention, wherein the outer elbow section defines a substantially cylindrical body portion for receiving the inner elbow section.

FIG. 10 is a front plan view of the elbow fitting of FIG. 9.

FIG. 11 is a side plan view of the elbow fitting of FIG. 9.

DETAILED DESCRIPTION

Figure 2:
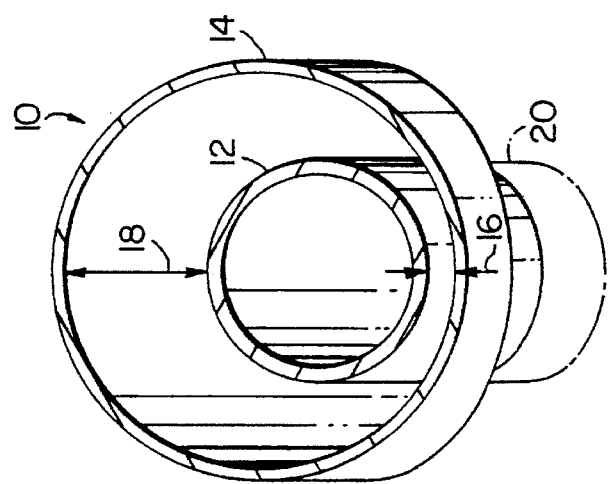
FIG. 2 is a cross-sectional view of the elbow fitting of FIG. 1 taken along the line 2—2 of FIG. 1.
Figure 1:
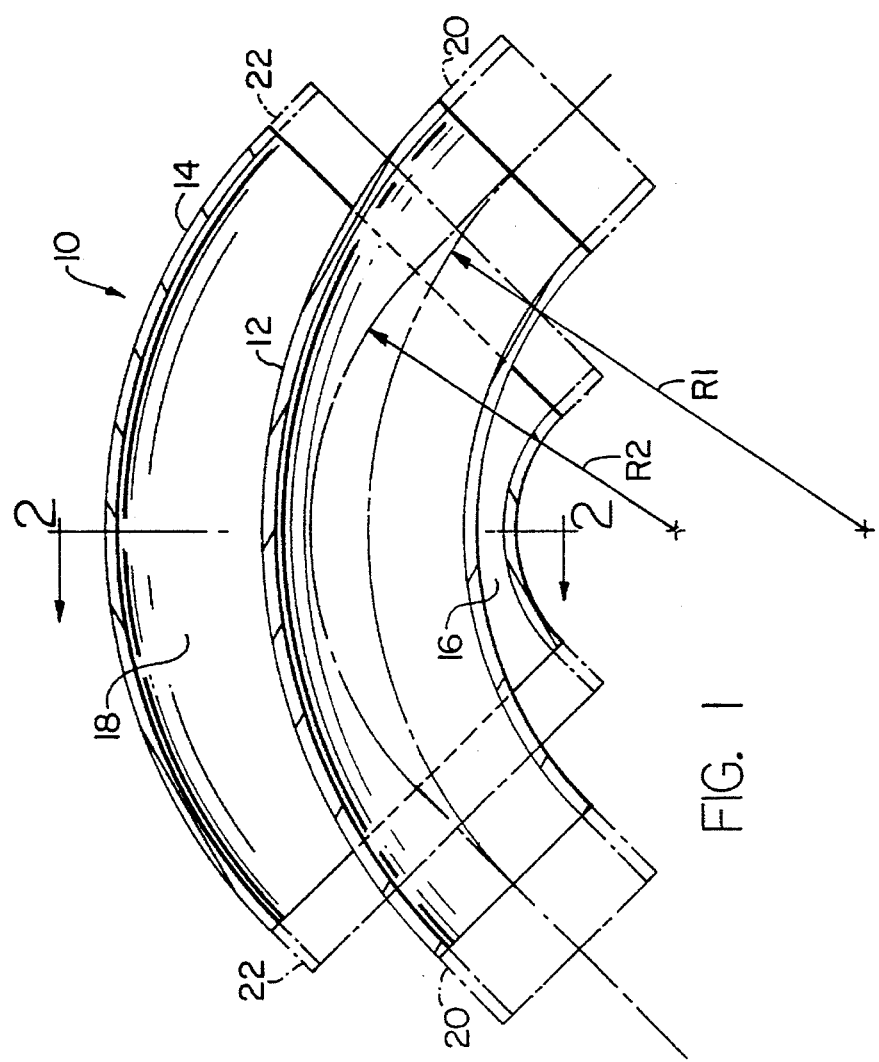
FIG. 1 is a cross-sectional view of a first embodiment of an elbow fitting embodying the present invention for a double-containment system in which the centerline radius of the inner elbow section is greater than the centerline radius of the outer elbow section to accommodate for differential thermal expansion and/or contraction of the inner and outer piping components relative to each other.

In FIGS. 1 and 2, an elbow fitting for a double-containment pipe assembly embodying the present invention is indicated generally by the reference numeral 10. The elbow fitting 10 comprises an inner (or primary containment) elbow section 12 contained within an outer (or secondary containment) elbow section 14. The ends of each elbow section 12 and 14 are attached to straight sections of inner (or primary containment) pipe and outer (or secondary containment) pipe, respectively (not shown), forming a double-containment pipe assembly. As can be seen, the ends of the inner and outer sections 12 and 14 are flat sections designed for butt joining to corresponding straight sections of pipe (not shown).

As shown in FIG. 1, the inner pipe section 12 is defined by a centerline radius of curvature R1 and the outer pipe section 14 is defined by a centerline radius of curvature R2, wherein R1 is greater than R2. The centerline radius of curvature of each pipe section is the radius of the centerline of the respective section, and the centerlines of the inner and outer elbow sections are illustrated in dashed lines in FIG. 1. Because the inner radius R1 is greater than the outer radius R2, the annulus between the inner and outer elbow sections defines a relatively narrow inner annulus space 16 between the inside walls of the inner and outer elbow sections, and a relatively wide outer annulus space 18 between the outside walls of the inner and outer elbow sections.

Another term known by those skilled in the art that may be used to describe the relationship of the inner and outer elbow sections of the present invention is the centerline-to-end radius, which is defined as the distance between the centerline on one end of the curved portion of the elbow section, and a parallel straight line extending from the other end of the curved portion of the elbow section. The centerline-to-end radius is the same dimension as the centerline radius for each of the elbow sections illustrated in FIG. 1.

If desired, the inner elbow section 12 can be formed to include straight tangent sections 20 on either end, as illustrated in dashed lines in FIG. 1, for attachment to corresponding straight sections of inner pipe (not shown). The outer elbow section 14 can likewise include straight tangent sections 22 on either end, as shown in dashed lines in FIG. 1, for attachment to corresponding straight sections of outer pipe (not shown).

One advantage of the elbow fittings of the present invention, is that because the radius R1 of the inner elbow section is greater than the radius R2 of the outer elbow section, there is sufficient space provided between the inner and outer elbow sections defined by the outer annulus 18, to accommodate differential thermal expansion or contraction between the inner and outer components of the double-containment system. The greater the radius R1 in comparison to the radius R2, the greater is the space defined by the outer annulus space 18 for accommodating differential thermal expansion or contraction.

In the embodiment of the present invention illustrated in FIGS. 1 and 2, the outer elbow section 14 is a standard "off-the-shelf" short-radius elbow fitting, wherein the centerline radius R2 is approximately equal to the diameter. The inner elbow section 12, on the other hand, defines a centerline radius R1 of approximately 5.5 times the diameter. Thus, in this instance, if the outer elbow section is a 4 inch diameter elbow, it defines a centerline R2 radius of approximately 4 inches, and if the inner elbow section is a 2 inch diameter elbow, it defines a centerline radius R1 of approximately 11 inches. These numbers are purely exemplary, however, and it is only necessary that the centerline radius R1 of the inner elbow section be greater than the centerline radius R2 of the outer elbow section, although in certain instances the centerline radius of the inner elbow section may be substantially greater than the centerline radius of the outer elbow section. In any event, the outer elbow section can be selected from any of a number of standard off-the-shelf elbow sections, and the inner elbow section can be custom made in accordance with the present invention. If the inner elbow section is made of metal, it can be formed from a straight pipe section by bending the straight pipe into an elbow section having a selected centerline radius.

As described above, when there is differential thermal expansion between the inner components and the outer components of a double-containment system, it is typically the inner components expanding to a greater degree than the outer components, because the inner components are transporting fluids at an elevated temperature in comparison to the temperature of the outer components. Another typical type of differential thermal expansion is when the outer components contract to a greater degree than the inner components. In either case, such differential thermal expansion or contraction causes the outside wall of the inner section 12 to expand or move outward toward the inside wall of the outer section 14, or the inside wall of the outer section 14 to contract or move inward toward the outside wall of the inner section 12. With the elbow fittings of the present invention, however, because the radius R1 of the inner section is greater than the radius R2 of the outer section, the outer annulus space 18 is relatively larger than in prior art elbow fittings wherein the inner elbow centerline-to-end radius is less than the outer elbow centerline-to-end radius. As a result, the elbow fittings of the present invention provide a greater space in the outer annulus in order to adequately accommodate such differential thermal expansion or contraction without permitting the inner and outer elbow sections to contact one another, and in turn cause failure, as was the case with many prior art double-containment elbow fittings.

The greater the length of each straight section attached to the inner elbow section 12, the greater is the thermal expansion or contraction of this section, all other parameters being equal, and thus the greater is the movement of the inner elbow section 12 relative to the outer elbow section 14, or vice-versa, in response to differential thermal expansion or contraction. Accordingly, the radius R1 and the radius R2 are each selected based upon the expected differential thermal expansion or contraction of the inner pipe sections relative to the outer pipe sections, in order to ensure that a sufficient space is defined by the outer annulus space 18 in order to adequately accommodate for such differential thermal expansion or contraction (and thus prevent contact between the inner and outer sections, which can cause failure). To ensure that these concerns are adequately addressed, the inner radius R1 is selected in accordance with this embodiment of the present invention so that it is at least greater than the outer radius R2.

Another advantage of the elbow fittings of the present invention, is that because the radius R1 of the inner elbow section 12 is greater than the radius R2 of the outer elbow section 14, and thus the inner radius R1 is greater than the inner radius in corresponding prior art double-containment elbow fittings designed for use with the same size straight sections of pipe, there is a lower accumulation of stress in the primary elbow section in comparison to such prior art elbow fittings. These advantages are significant in allowing a double-containment system to be designed and installed which allows for adequate flexibility, and does not necessarily require an increase in the diameter of the outer piping in the area of the elbows, which might otherwise be the case when employing standard "off-the-shelf" elbow fittings in order to accommodate for differential thermal expansion or contraction.

Figure 3:
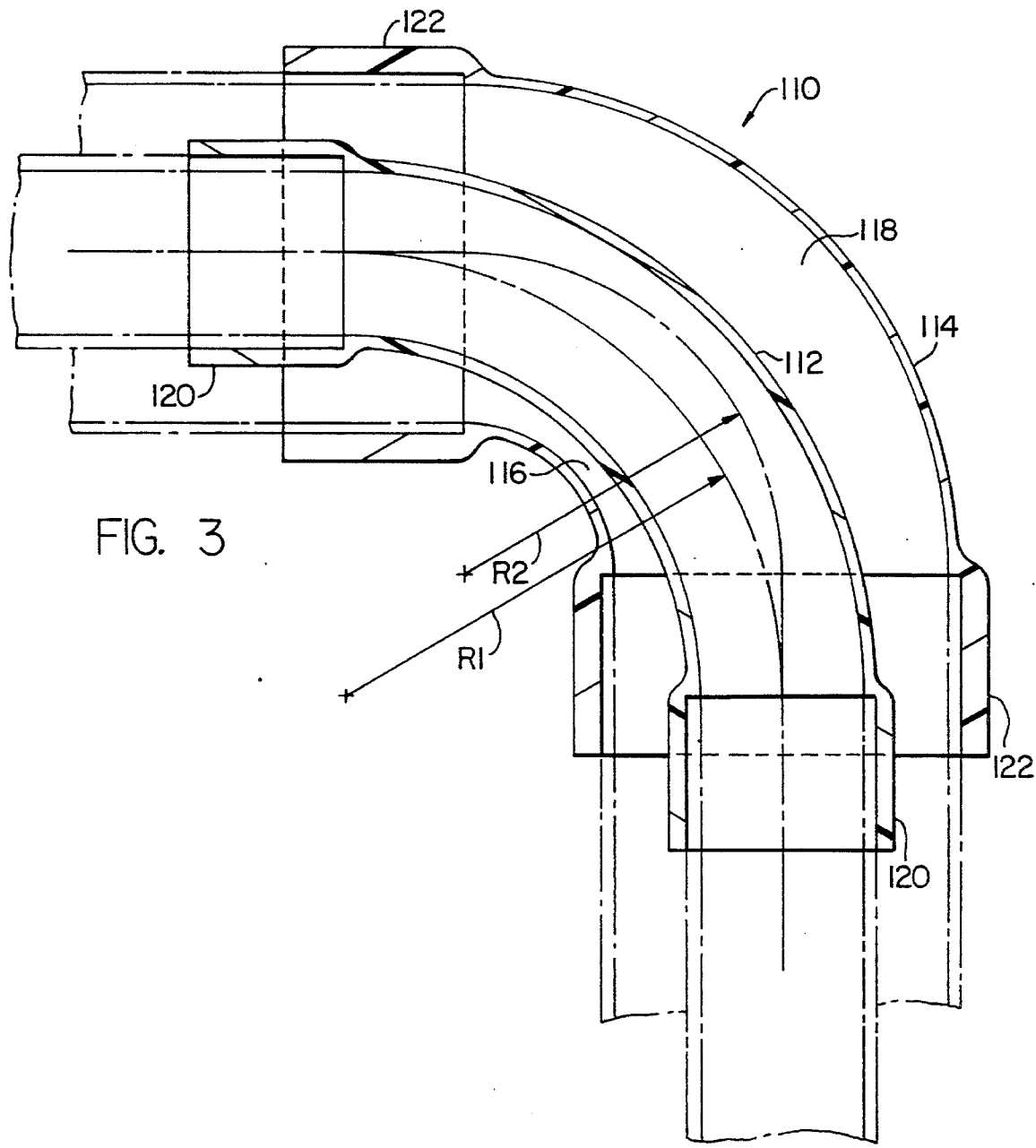
FIG. 3 is a cross-sectional view of another embodiment of an elbow fitting of the present invention including socket portions on either end of the inner and outer elbow sections for socket joining to straight sections of pipe.

Turning to FIG. 3, another elbow fitting embodying the present invention is indicated generally by the reference numeral 110. The elbow fitting 110 is similar to the elbow fitting 10 described above in connection with FIGS. 1 and 2, and therefore like reference numerals preceded by the numeral 1 are used to indicate like elements. The outer elbow section 114 is a standard 90° short-radius elbow section, and the inner elbow section 112 defines a longer centerline radius R1 in order to form a relatively wide outer annulus space 118 to accommodate differential thermal expansion or contraction.

The elbow fitting 110 differs from the elbow fitting 10 described above in that the inner elbow section 112 includes straight socket portions 120 extending outward from either end of the curved portion of the elbow section, and the outer elbow section 114 similarly includes straight socket portions 122 extending outward from either end of the curved portion of the elbow section. Each of the elbow sections 112 and 114 are adapted for socket joining to straight sections of pipe in a double-containment assembly, as illustrated in dashed lines in FIG. 3.

As will be recognized by those skilled in the art, the elbow fittings of the present invention can be formed of any of numerous materials used to manufacture double-containment pipe assemblies, including any metallic, reinforced or unreinforced thermosetting plastic, thermoplastic, or plastic material. The end portions of each elbow section can likewise be formed in any of numerous known constructions for attachment to other sections of pipe, including the constructions described above for butt welding and socket joining, or may likewise define a tapered shape for attachment in reinforced thermosetting plastic applications. For example, the inner elbow section may be formed with straight elbow sections for butt welding, and the outer elbow section may be formed with socket connections, or vice-versa.

It is also not necessary that the curved portions of each of the inner and outer elbow sections occupy the same sector of a circle, as illustrated in FIGS. 1 and 3. As can be seen, in each of these embodiments, the curved portions of the inner elbow sections occupy a larger sector of a circle than do the curved portions of the corresponding outer elbow sections (i.e., the curved portion of each inner elbow section defines a larger angular measurement than does the curved portion of the respective outer elbow section, as measured in radians, for example).

Figure 4:
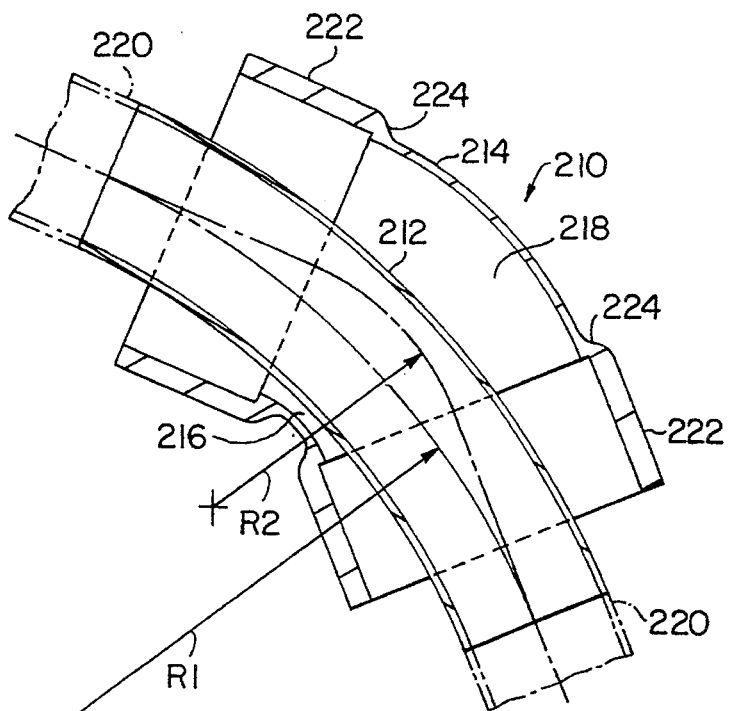
FIG. 4 is a cross-sectional view of another embodiment of an elbow fitting of the present invention including socket portions on each end of one elbow section for socket joining to straight sections of pipe, and flat portions on each end of the other elbow section for butt-joining to straight sections of pipe.

In FIG. 4, another elbow fitting embodying the present invention is indicated generally by the reference numeral 210. The elbow fitting 210 is similar to the elbow fitting 110 described above, and therefore like reference numerals preceded by the numeral 2 instead of the numeral 1 are used to indicate like elements.

The outer elbow section 214 is a 45° standard, off-the-shelf elbow fitting with socket portions 222 on either end for socket joining to corresponding straight sections of outer pipe (not shown). Although the socket portions 222 are illustrated as straight sockets, they may be formed with tapered inside surfaces to match corresponding tapered sections on the straight sections of outer pipe, or to match a straight pipe section by design, i.e., an interference fit. As shown in FIG. 4, the cross-sectional thickness of each of the socket portions 222 is greater than the cross-sectional thickness of the curved section of the pipe in order to provide increased strength in this area. As also shown in FIG. 4, an annular tapered section 224 defines the transition area between each socket portion 222 and the curved section of the outer pipe, which facilitates in uniformly distributing stress that develops in the socket portions due to the transmission of forces between the straight sections of pipe and the elbow fitting.

The inner elbow section 212 defines flat end portions for butt joining to corresponding straight sections of primary pipe (not shown). If necessary, straight tangent portions 220 may be included on either end of the curved section of the inner elbow section, as indicated in dashed lines in FIG. 4. Because the outer elbow section 214 is a 45° section, the inner elbow section 212 defines a substantially larger centerline radius R1 than the centerline radius R2 of the outer elbow section. This is necessary in order to maximize the width of the outer annulus space 218 (i.e., the distance between the large-radius wall of the outer elbow section 214 and the large-radius wall of the inner elbow section 212) to accommodate expansion of the primary piping components relative to the secondary containment system, and/or contraction of the secondary containment system relative to the primary piping system. The inner annulus space 216 is sufficient, however, to prevent any contact between the smaller-radius walls of the inner and outer elbow sections, and to permit fluid flow through the inner annulus space, if necessary.

Figure 5:
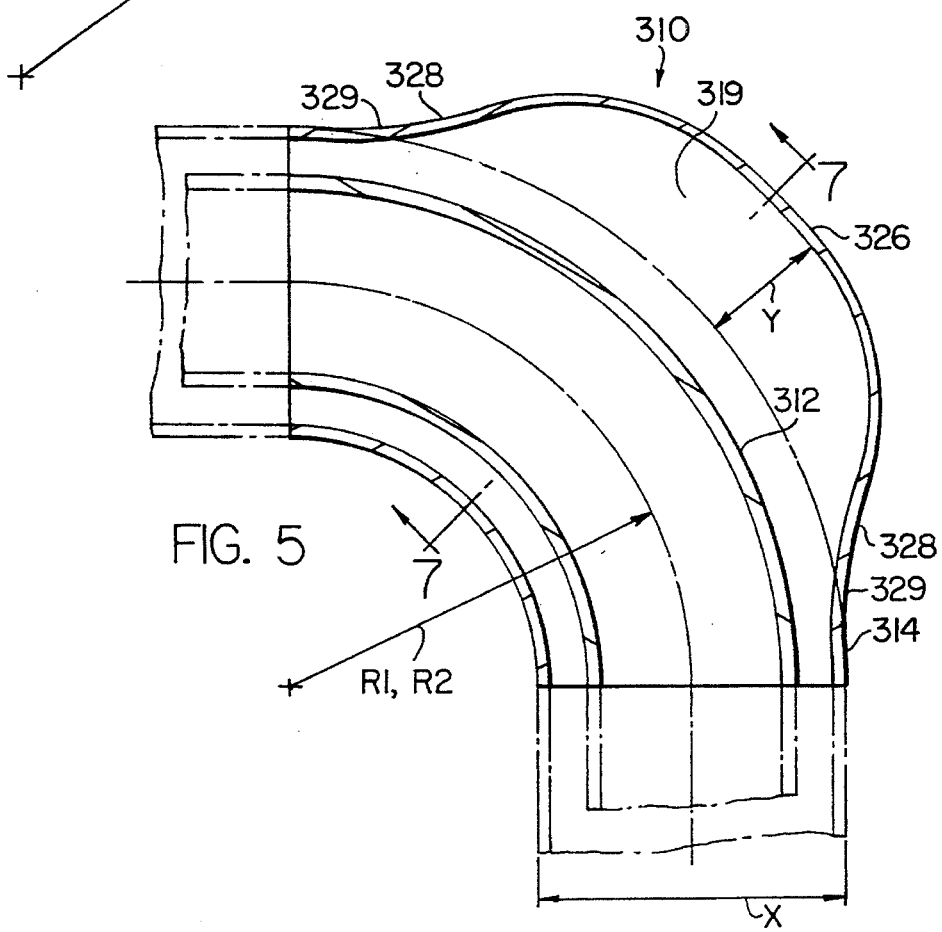
FIG. 5 is a cross-sectional view of another embodiment of an elbow fitting of the present invention including an eccentric portion formed in the outer elbow section and defining a relatively wide outer annulus space between the inner elbow section and the outer elbow section for accommodating differential thermal expansion and/or contraction of the inner and outer piping components relative to each other.
Figure 7:
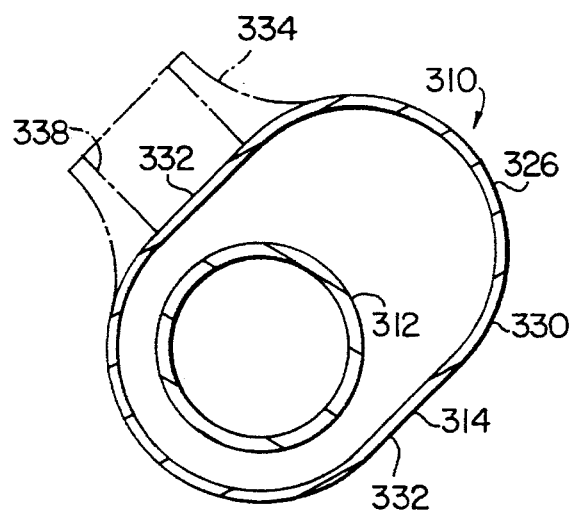
FIG. 7 is a cross-sectional view of the elbow fitting of FIG. 5 taken along the line 7—7 of FIG. 5.
Figure 6:
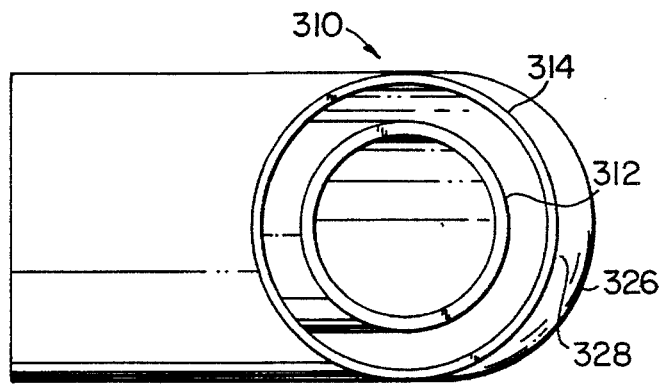
FIG. 6 is an end view of the elbow fitting of FIG. 5.

In FIGS. 5–7, another elbow fitting embodying the present invention is indicated generally by the reference numeral 310. The elbow fitting 310 includes an inner elbow section 312 contained within an outer elbow section 314. The inner elbow section 312 is similar to the inner elbow section 10 described above in connection with FIG. 1, in that it defines a uniform curvature, and a uniform centerline radius of curvature R1.

In the outer elbow section 314, on the other hand, the larger-radius wall (or outside wall) defines an eccentric portion 326 extending outward from the end portions of the elbow section. The outside diameter of each end portion of the outer elbow section is indicated as X in FIG. 5, and the eccentric portion 326 extends a distance Y at its farthest point beyond the surface defined by the outside diameter X.

As can be seen, the eccentric portion 326 defines an expanded outer annulus space 319 for accommodating differential thermal expansion of the inner piping components toward the outer piping components, or contraction of the outer piping components toward the inner piping components. The eccentric portion 326 defines tapered portions 328 on each end of the eccentric portion in the axial direction of the elbow section, which taper inward toward the end portions of the outer elbow section. These tapered surfaces 328 each define a smooth or gradual taper from the outermost point of the eccentric portion 326 inward toward the end portions of the elbow section, in order to uniformly distribute any stress developed within the outer elbow section. As shown in FIG. 7, the sides of the eccentric portion 326 are defined by curved walls 330, which each curve inward from the outermost point of the eccentric portion into a respective straight portion 332, thus forming a generally oval cross-section. As will be recognized by those skilled in the art, the wall thickness of the eccentric portion 326 is increased proportionately in order to achieve an equivalent pressure rating throughout the fitting.

The inner elbow section 312 has a maximum bending characteristic based on an allowable stress for the elbow section. Based on this maximum achievable distortion of the inner elbow section, the eccentric portion 326 is dimensioned to accommodate that maximum distortion due to bending while maintaining a threshold spacing between the distorted inner elbow section and the inner walls of the eccentric portion. The points 329 at which the eccentric portion 326 begins on either end of the outer elbow section in the axial direction, are selected based on the maximum distortion pattern of the inner elbow section to ensure that a threshold spacing is maintained between the inner and outer elbow sections in the event that there is such maximum allowable distortion.

A tee port 334 may be formed or attached to the eccentric portion 326, as indicated in dashed lines in FIG. 7, for mounting a leak detection probe, for the installation of a leak detection cable, and/or for gaining access to the interior of the elbow fitting for repair and maintenance. For example, an access opening 338 through the tee port 336 may be dimensioned sufficiently large to permit removal and insertion of the primary pipe through the access opening for repair and maintenance of the primary pipe. A suitable cap, flange or riser expansion can be attached to the tee port 334 in a manner known to those skilled in the art.

One advantage of the elbow fitting 310 is that the eccentric portion 326 provides an added measure of security for accommodating differential thermal expansion by providing a relatively wide outer annulus space 319. The dimensions of the eccentric portion 326 are selected depending upon the maximum differential thermal expansion or contraction expected during operation of the double-containment assembly. Also, in this embodiment of the present invention, it is not always necessary to form the inner elbow portion with a larger centerline-to-end radius, than the centerline-to-end radius of the outer elbow portion. In the embodiment of the present invention illustrated, the curvature of the smaller-radius wall of the outer elbow section 314 substantially matches the curvature of the smaller-radius wall of the inner elbow section 312. In order to save costs, it may be possible to employ a standard, off-the-shelf inner elbow section 312 with the outer elbow section 314, which will still provide a sufficient space within the outer annulus 319 because of the eccentric portion 326 to accommodate differential thermal expansion or contraction.

Figure 8:
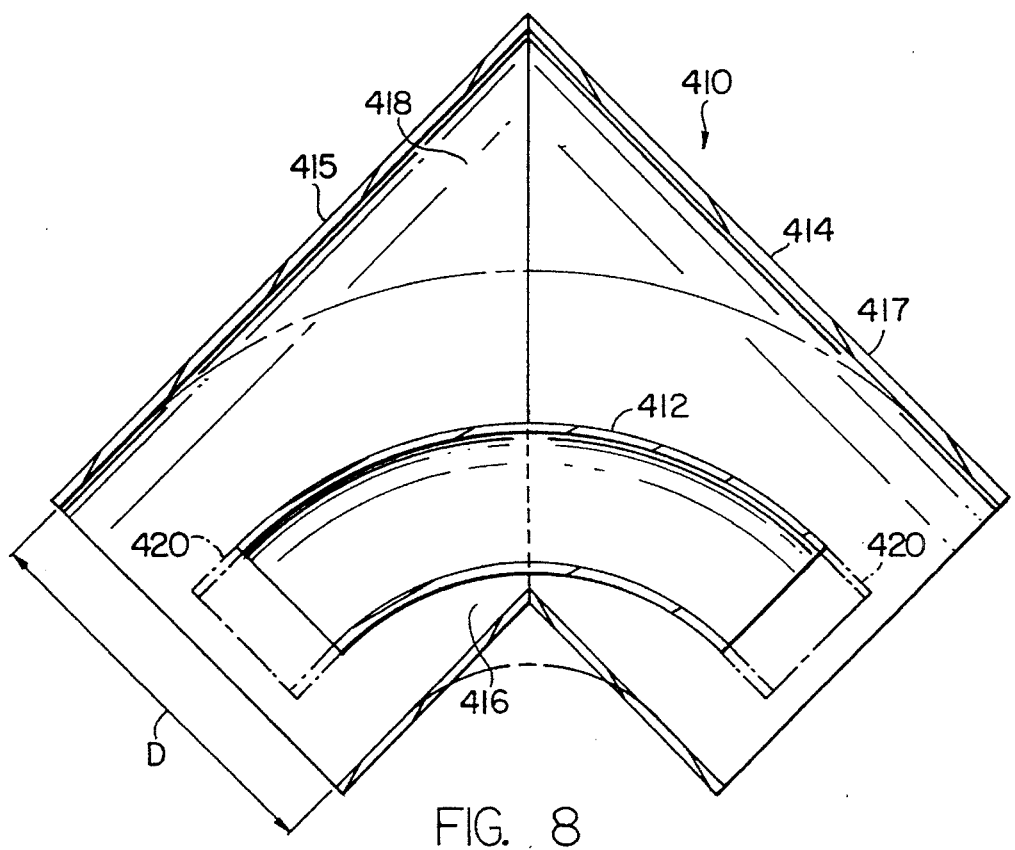
FIG. 8 is a cross-sectional view of another embodiment of an elbow fitting of the present invention, wherein the outer elbow section is formed by two substantially cylindrical sections joined along mitered surfaces.

In FIG. 8, another embodiment of an elbow fitting of the present invention is indicated generally by the reference numeral 410. The elbow fitting 410 is similar to the elbow fitting 10 described above in connection with FIGS. 1 and 2, and therefore like reference numerals preceded by the numeral 4 are used to indicate like elements.

The elbow fitting 410 differs from the elbow fitting 10 in that the outer elbow section 410 is defined by two straight cylindrical sections 415 and 417, each defining a mitered surface on one end, which are joined together along the periphery of the mitered surfaces by welding, for example. The inside diameter of each cylindrical section 415 and 417 is indicated as D in FIG. 8, and the imaginary inside radius, outside radius, and centerline radius R2 of a curved elbow section defined by the diameter D are illustrated in dashed lines. As can be seen, the centerline radius R1 of the inner elbow section is greater than the centerline radius R2, and there is a substantially greater distance between the larger-radius surface of the inner elbow section 412 and the outer elbow section 414, than between the smaller-radius surface of the inner elbow section and the outer elbow section, defining an expanded outer annulus space 418 for accommodating differential thermal expansion or contraction.

In FIGS. 9–11, another embodiment of an elbow fitting of the present invention is indicated generally by the reference numeral 510. The elbow fitting 510 is similar in certain respects to the elbow fitting 410 described above in connection with FIG. 8, and therefore like reference numerals preceded by the numeral 5 instead of the numeral 4 are used to indicated like elements.

The elbow fitting 510 differs from the elbow fitting 410 in that the outer elbow section 514 includes a substantially cylindrical body portion 513, and two substantially cylindrical flanges 515 and 517 projecting outward from the body portion 513 on substantially opposite sides of the body portion relative to each other. As shown in FIG. 9–11, the inner elbow section 512 is received through the flanges 515 and 517, and the ends of the inner elbow section are substantially concentric with the respective cylindrical flanges. Because the body portion 513 is substantially cylindrical, a relatively wide outer annulus space 518 is defined between the larger-radius surface of the inner elbow section 512 and the opposing wall of the body portion 513. Imaginary radii extending between the cylindrical flange portions 515 and 517 are illustrated in FIG. 9, which approximate the shape of a curved elbow section having the same diameter as each of the cylindrical flanges. As can be seen, the cylindrical body portion 513 defines a substantial outer annulus space beyond the imaginary outer radius, and thus beyond the outer annulus space provided by a correspondingly sized outer curved elbow section.

As indicated in dashed lines in FIG. 11, a bottom wall 519 of the cylindrical body portion 513 may be inclined with respect to a plane of a top wall 521 of the body portion in order to facilitate usage of a leak detection device. If there is any leakage of fluid within the outer elbow section 510, the fluid will flow down onto the bottom wall 519, and collect at the lowest point of the inclined bottom wall. A leak detection probe (not shown) can be mounted in the top wall 521 directly above the lowest point of the inclined bottom wall 519 (i.e., adjacent to the outside wall of the body portion 513), and extend downward toward the bottom wall to detect the collection of any leaking fluids. A drainage port (not shown) can be installed approximately at the lowest point of the inclined bottom wall to drain any fluids, and/or a removal tube (not shown) can be inserted through the top wall 521 to remove any such fluids.

One advantage of the elbow fitting 510 is cost savings. For example, the cylindrical body portion 513 of the outer elbow fitting can be formed by cutting a straight section of pipe having a diameter equal to the selected diameter of the cylindrical body portion. The cylindrical flanges and top and bottom walls can then be relatively inexpensively formed and attached to the cylindrical body portion. If necessary, the top wall 521 can take the form of a threaded cap with an O-ring gasket or other type of seal between the cap and the body portion. The cap can then be removed for repair, maintenance and/or removal of the inner piping components. In this embodiment of the present invention, the diameter of the cylindrical portion 513 is 36 inches or less. This elbow fitting is principally intended for 45° or 90° elbow sections, i.e., the angle defined between the axes of the cylindrical flange portions 515 and 517.

A major advantage with each of the elbow fittings of the present invention, is that the relatively wide outer annulus space, as compared to the more narrow inner annulus space, allows for a significantly greater amount of deflection of the primary piping components in comparison to the deflection or expansion of the secondary containment piping components of a double-containment system. These advantages are particularly important when there is a greater amount of thermal expansion in the primary piping components as compared to the secondary containment components, or when there is a greater amount of contraction of the secondary containment components in comparison to the primary piping components. Because the centerline radius of the inner elbow section is greater than the centerline radius of the outer elbow section, and/or because of the expanded eccentric portion of the outer elbow section, there is a relatively wide outer annulus space between the outer wall of the inner elbow section, and the inner wall of the outer elbow section, permitting movement of the primary pipe in the direction of positive expansion, or movement of the secondary containment pipe in the direction of contraction. Thus, the unique radius combinations of the inner and outer elbow sections and/or the eccentric portions of the outer elbow sections of the present invention, provide maximum space between the inner and outer elbow sections in the direction of thermal expansion or contraction, without requiring a significant increase in the overall diameter of the outer elbow section.

Another advantage of the elbow fittings of the present invention, is that the inner and outer elbow sections are not connected to each other, but rather are each only joined to the corresponding adjacent sections of inner or outer straight pipe. Thus, the annulus between the inner and outer elbow fittings is unobstructed, permitting freedom of movement of the inner and outer elbow sections relative to each other with movement of the corresponding straight sections of pipe in response to differential thermal expansion or contraction. This, in combination with the relatively wide outer annulus space allows freedom of movement of the inner elbow sections and outer elbow sections relative to each other in response to differential thermal expansion and/or contraction, and thus substantially minimizes the stress and resultant failures encountered in prior double-containment systems.

Another advantage of the elbow fittings of the present invention is that they are particularly suitable for drainage applications. Double-containment assemblies used in drainage systems define a downward incline so that the fluid flowing through the primary piping components is drained by gravity into a collection reservoir. Because the inner elbow sections of the present invention each define a relatively large centerline radius in comparison to correspondingly sized off-the-shelf short-radius elbows, there is typically better fluid flow and drainage in double-containment systems employing the elbow fittings of the present invention. With the larger-radius inner elbow sections, the inner elbow sections define a smoother sweep, and in turn there is less turbulence and fluid back-up normally associated with such turbulence in comparison to prior art short-radius elbow sections.

I claim:

1. An elbow fitting for a double-containment pipe assembly, comprising an outer elbow section defining a first centerline radius of curvature, and an inner elbow section received within the outer elbow section and defining a second centerline radius of curvature greater than the first centerline radius of curvature.

2. An elbow fitting as defined in claim 1, wherein the distance between the smaller-radius walls of the inner and outer elbow sections is less than the distance between the larger-radius walls of the inner and outer elbow sections for accommodating movement of the inner and outer elbow sections relative to each other.

3. An elbow fitting as defined in claim 1, defining a substantially unobstructed space throughout the annulus between the inner and outer elbow sections for displacement of the inner and outer elbow sections relative to each other in response to differential thermal expansion or contraction.

4. An elbow fitting as defined in claim 1, wherein each end of the inner elbow section includes one of a socket for socket joining to straight sections of pipe and a substantially flat section for butt joining to straight sections of pipe.

5. An elbow fitting as defined in claim 1, wherein each end of the outer elbow section includes one of a socket for socket joining to straight sections of pipe and a substantially flat section for butt joining to straight sections of pipe.

6. An elbow fitting as defined in claim 1, wherein the outer elbow section defines an eccentric portion projecting outward from the outer elbow section and defining an expanded outer annulus space between the eccentric portion and the inner elbow section for accommodating movement of the inner and outer elbow sections relative to each other.

7. An elbow fitting for a double-containment assembly, comprising an outer elbow section defining a first centerline-to-end radius, and an inner elbow section defining a second centerline-to-end radius greater than the first centerline-to-end radius to accommodate differential thermal expansion or contraction of the inner and outer elbow sections relative to each other.

8. An elbow fitting as defined in claim 7, wherein the outer elbow fitting defines a smaller-radius wall and a larger-radius wall on a substantially opposite side of the outer elbow fitting relative to the smaller-radius wall, and the larger-radius wall defines an eccentric portion projecting outward from the surrounding portions of the larger-radius wall and defining an expanded outer annulus space between the eccentric portion and the inner elbow section for accommodating movement of the inner elbow section and the outer elbow section relative to each other in response to differential thermal expansion or contraction.

9. An elbow fitting as defined in claim 7, defining a substantially unobstructed space throughout the annulus between the inner and outer elbow sections for displacement of the inner and outer elbow sections relative to each other in response to differential thermal expansion or contraction.

10. An elbow fitting as defined in claim 7, wherein each end of the inner elbow section includes one of a socket for socket joining to straight sections of pipe and a substantially flat section for butt joining to straight sections of pipe.

11. An elbow fitting as defined in claim 7, wherein each end of the outer elbow section includes one of a socket for socket joining to straight sections of pipe and a substantially flat section for butt joining to straight sections of pipe.

12. An elbow fitting as defined in claim 7, wherein one end of at least one of the inner and outer elbow sections defines a socket connection, and an annular surface tapering inward and extending between the socket connection and an outside surface of the respective elbow section.

13. A double-containment assembly including at least one inner pipe located within at least one containment component, and an elbow fitting including an inner elbow section coupled to a corresponding inner pipe, and an outer elbow section coupled to a corresponding containment component, the inner elbow section defining a smaller-radius surface and a larger-radius surface on a substantially opposite side of the inner elbow section relative to the smaller-radius surface, the elbow fitting defining a first annulus width between the smaller-radius surface and the outer elbow section, and a second annulus width between the larger-radius surface and the outer elbow section, the first annulus width being less than the second annulus width substantially throughout each annulus for accommodating differential thermal expansion or contraction of the inner piping and the containment components relative to each other.

14. A double-containment assembly as defined in claim 13, wherein the elbow fitting defines a substantially unobstructed space throughout the annulus between the inner and outer elbow sections for displacement of the inner and outer elbow sections relative to each other.

15. A double-containment assembly as defined in claim 13, wherein each end of the inner elbow section includes one of a socket for socket joining to straight sections of pipe and a substantially flat section for butt joining to straight sections of pipe.

16. A double-containment assembly as defined in claim 13, wherein each end of the outer elbow section includes one of a socket for socket joining to straight sections of pipe and a substantially flat section for butt joining to straight sections of pipe.

17. An elbow fitting as defined in claim 13, wherein one end of at least one of the inner and outer elbow sections defines a socket connection, and an annular surface tapering inward and extending between the socket connection and the outside surface of the respective elbow section.

18. An elbow fitting as defined in claim 13, wherein the outer elbow section defines a first substantially cylindrical section and a second substantially cylindrical section, each substantially cylindrical section defining a mitered surface, and the two substantially cylindrical sections being joined along the mitered surfaces.

19. An elbow fitting as defined in claim 13, wherein the outer elbow section defines in inside wall located substantially opposite to and facing the smaller-radius surface of the inner elbow section, and an outside wall located on a substantially opposite side of the outer elbow section relative to the inside wall and defining an eccentric portion projecting outward from the outer elbow section and defining an expanded outer annulus space between the eccentric portion and the larger-radius surface of the inner elbow section.

20. An elbow fitting for a double-containment pipe assembly, comprising an outer elbow section and an inner elbow section received within the outer elbow section, the inner elbow section defining a smaller-radius surface, a larger-radius surface on a substantially opposite side of the inner elbow section relative to the smaller-radius surface, and a first centerline radius of curvature, the inner and outer elbow sections defining an unobstructed space throughout the annulus between the inner and outer elbow sections, and a first annulus width between one end of the larger-radius surface and the outer elbow section, and a second annulus width between the approximate midpoint between the ends of the larger-radius surface and the outer elbow section, wherein the second annulus width is greater than the first annulus width.

21. An elbow fitting as defined in claim 20, wherein the inner elbow section defines a first centerline radius of curvature and the outer elbow section defines a second centerline radius of curvature less than the first centerline radius of curvature.

22. An elbow fitting as defined in claim 20, wherein the outer elbow section defines a substantially cylindrical body portion defining a first aperture on one side of the body portion and a second aperture on an opposite side of the body portion relative to the first aperture, and the inner elbow section is received through the first and second apertures.

23. An elbow fitting as defined in claim 22, wherein the outer elbow section includes two flange portions, each coupled to one of the first and second apertures, and an axis of each flange portion is substantially perpendicular to the axis of the cylindrical body portion.

24. An elbow fitting as defined in claim 20, wherein the outer elbow section defines a first substantially cylindrical section and a second substantially cylindrical section, each substantially cylindrical section defining a mitered surface, and the two substantially cylindrical sections are joined along the mitered surfaces.

25. An elbow fitting as defined in claim 20, wherein the outer elbow section defines in inside wall located substantially opposite to and facing the smaller-radius surface of the inner elbow section, and an outside wall located on a substantially opposite side of the outer elbow section relative to the inside wall and defining an eccentric portion projecting outward from the outer elbow section and defining the second annulus width between the eccentric portion and the larger-radius surface of the inner elbow section.

26. An elbow fitting as defined in claim 20, wherein the outer elbow section includes a fitting portion defining an aperture extending therethrough for accessing the interior of the elbow fitting.

* * * * *